United States Patent
Marr et al.

(10) Patent No.: US 9,500,836 B2
(45) Date of Patent: Nov. 22, 2016

(54) PRECISION OPTICAL MOUNT FOR OPTICAL DEVICES

(71) Applicant: Raytheon Company, Waltham, MA (US)

(72) Inventors: Lyale F. Marr, Richardson, TX (US); Douglas J. Hartnett, The Colony, TX (US);

(Continued)

(73) Assignee: Raytheon Company, Waltham, MA (US)

( * ) Notice: Subject to any disclaimer, the term of this patent is extended or adjusted under 35 U.S.C. 154(b) by 197 days.

(21) Appl. No.: 14/337,034

(22) Filed: Jul. 21, 2014

(65) Prior Publication Data

US 2016/0018618 A1      Jan. 21, 2016

(51) Int. Cl.
  *G02B 7/00*       (2006.01)
  *B32B 37/14*      (2006.01)
  (Continued)

(52) U.S. Cl.
  CPC .......... *G02B 7/003* (2013.01); *B32B 37/1292* (2013.01); *B32B 37/142* (2013.01); *B32B 37/18* (2013.01);
  (Continued)

(58) Field of Classification Search
  CPC ................... G02B 7/003; G02B 27/62; G02B 7/008; G02B 7/026; G02B 7/1825;
  (Continued)

(56) References Cited

U.S. PATENT DOCUMENTS 3,907,442 A * 9/1975 Reid .................. B64C 3/34
                                                     220/681
4,763,991 A    8/1988 Klotz
(Continued)

FOREIGN PATENT DOCUMENTS

CN      101520533 B    12/2012
DE    102011005408 A1   9/2012
(Continued)

OTHER PUBLICATIONS

Vukobratovich, "Introduction to Opto-Mechanical Design", Jan. 1993, pp. 126-128, Society of Photo Optical, Tuscon, AZ.

(Continued)

*Primary Examiner* — Bradley Duckworth (57) ABSTRACT

An optical mount and mounting system including an optical device, a housing, and a plurality of optical mounts that couple the optical device to the optical housing. Each mount includes a sleeve attached to the optical device and each sleeve includes a bore. Studs are attached to the optical housing and each stud includes an outer bonding surface extending through the bore of each sleeve. Once the optical device is aligned properly, a curable material is deposited into the sleeve and cured between the sleeve and the stud, such that the curable material couples the sleeve and the stud to each other to provide a robust structural joint that minimizes self-induced stresses into the optic. A series of annular conical portions and corresponding surfaces are provided to retain registration of the optical device against dynamic shearing and bending forces. A method of aligning and mounting an optical device is provided.

22 Claims, 6 Drawing Sheets

(72) Inventors: Randy W. White, Greenville, TX (US); Richard L. Scott, The Colony, TX (US)

(51) Int. Cl.
*B32B 37/18* (2006.01)
*B32B 37/12* (2006.01)
*F16B 5/02* (2006.01)
*F16B 9/02* (2006.01)
*F16B 11/00* (2006.01)
*G02B 7/182* (2006.01)

(52) U.S. Cl.
CPC ............... *F16B 5/025* (2013.01); *F16B 9/026* (2013.01); *F16B 11/008* (2013.01); *G02B 7/1822* (2013.01); *B32B 2037/1253* (2013.01); *B32B 2551/00* (2013.01); *G02B 7/008* (2013.01)

(58) Field of Classification Search
CPC .............. F16B 11/008; Y10T 403/4694; Y10T 403/473
See application file for complete search history.

(56) References Cited

U.S. PATENT DOCUMENTS

| | | | |
|---|---|---|---|
| 6,395,207 B2* | 5/2002 | Hanlon | F16B 11/006 264/122 |
| 6,501,605 B2 | 12/2002 | Moriya | |
| 6,940,891 B2* | 9/2005 | Clary | G02B 7/003 372/107 |
| 7,079,259 B1 | 7/2006 | Stenten | |
| 7,493,004 B2* | 2/2009 | Tekippe | G02B 6/32 385/137 |
| 8,591,048 B2 | 11/2013 | Wiltse | |
| 2003/0133744 A1 | 7/2003 | Urback | |
| 2005/0053113 A1 | 3/2005 | Clary et al. | |
| 2006/0279838 A1 | 12/2006 | Kim et al. | |
| 2007/0270029 A1 | 11/2007 | Schroeder et al. | |
| 2013/0314813 A1 | 11/2013 | Vidal et al. | |
| 2014/0063632 A1* | 3/2014 | Jones | G02B 7/00 359/894 |
| 2016/0018618 A1* | 1/2016 | Marr | G02B 7/003 248/276.1 |

FOREIGN PATENT DOCUMENTS

| | | |
|---|---|---|
| GB | 2101257 A | 1/1983 |
| WO | WO 2008/147213 A1 | 12/2008 |

OTHER PUBLICATIONS

PCT Search Report for application PCT/US2015/031828 dated Jul. 31, 2015, 130 pages.

* cited by examiner

PRECISION OPTICAL MOUNT FOR OPTICAL DEVICES

BACKGROUND

Aligning and mounting optical devices (such as mirrors, lenses, lasers, fibers, focal plane arrays, etc.) within a high magnification, diffraction-limited optical system requires expensive fabrication processes and ultra-precision mounting techniques. This is primarily because each optical device must be mounted to millionths of an inch accuracy according to the precise requirements of the optical system. Various alignment mechanisms are used to assure exacting registration of the various components of the optical system. In addition, each component must be accurately positioned, in a strain-free condition, with respect to the intended propagation direction of electromagnetic radiation (e.g., light). The accuracy to which optical devices are both supported and positioned influences to a large extent the optical wavefront quality, or precision, of the optical system. Optical misalignments may be induced in a system during assembly, alignment, adjustment, calibration, or operation of the components. Because optical systems are assembled from several unique parts, at each imperfect interface between optical and housing components, certain stresses will be induced by fastening mechanisms and/or bonding processes.

Moreover, optical devices and hardware are typically installed at standard atmospheric temperatures and pressures. Exposure to environments, especially those associated with military applications, can induce thermally generated stresses, into both optics and opto-mechanical mounts, due to thermal expansion differences.

The type of stress induced onto an optical element determines the type of resulting distortion of its optical surface. One of the most optically-degrading stresses is that induced by bending the optic. Mirrors, distorted by bending loads, can especially degrade an optical wavefront because light reflects off of the surface of a mirror. Reflection of light off mirrors behaves according to the law of reflection, i.e., the angle of reflection equals the angle of incidence. Bending a mirror alters its surface profile, thereby perturbing both the incidence and reflection angles, all along the distorted profile. Thus this type of physical alteration of the mirror surface results in a line of sight "angle doubling error", as well as a complex distortion of the optical wavefront.

Since the profile distortion of a bent mirror is typically not uniform nor symmetrical, in every direction across the surface of the mirror, the wavefront distortion also not symmetrical. Thus, bending a mirror typically creates astigmatism in the optical wavefront. An astigmatic wavefront is generally saddle-shaped, which means that correction of this aberration also requires an optical surface that is not circularly symmetric, which is very difficult to fabricate. Thus, eliminating or minimizing bending in mirrors is crucial to achieving diffraction-limited optical performance, especially in all-reflective optical systems.

One common method of mounting and aligning an optical device (such as a secondary metal mirror of a telescope) involves diamond point machining the interface surfaces of both the optic and its mount. Once aligned, precision-machined kinematic fasteners are typically used to secure the optical device, to a housing or other mounting structure, to minimize inducing bolt-up stresses between the fasteners, the mirror, and the mount. While diamond point machined surfaces are very flat, they are not perfect, and thus when two of them are mated together the resultant interface is even less coplanar, which typically induces some bending into both the mirror and the mount.

Kinematic hardware, such as pairs of swivel washers, may be employed between a fastener and a mirror, and also between the mirror and its mount. In theory, such washer pairs can eliminate bending stresses at mating interfaces through the use of spherical surfaces that "swivel" to adjust for any angular misalignment between the interface features. While this swiveling capability compensates for angular differences at mating interfaces, there is always friction between the mating swivel surfaces. Friction can prevent perfect angular alignment especially as the attachment fastener is torqued and the friction forces increase. Thus any residual misalignment of these washers can couple the fastener preload forces into bending of the mirror and/or its mount. The higher the preload from the kinematic hardware, and the greater the angular misalignment in the swivel washers, combine to induce even greater bending moments into the mirror. Utilizing swivel washers between a mirror and its mount also adds thickness and location tolerance errors between these position-critical parts, which is typically very undesirable.

In addition to the challenge of achieving "stress-free" mounted mirrors, is the daunting task of positioning the optic to within millionths of an inch in each direction/ orientation, & retaining stability over varying environments. For these obvious reasons, along with a number of other less obvious reasons, the implementation of such mechanical attachment methods often culminates in a misaligned optical device, resulting in degraded optical performance of the system. Owing to the myriad of opportunities for degraded optics and optical wavefront, the prudent approach is to design an interface that does not compromise the integrity of the optic, regardless of the final mounted configuration.

Previous attempts have relied upon the combination of diamond point machined mount (or carrier) plates, mated with the diamond point machined back side of a metal mirror, and retained together with kinematic hardware. The mount plate is then positioned using ultra-precision alignment equipment, and the mount plate is bonded in place. This approach facilitates reuse of the mirror, in the event of unacceptable optical performance resulting from a failed alignment process, or following exposure to severe environmental conditions. The removal of the kinematic attachment hardware facilitates removal and reuse of the optic, with only the mount plate and support components to which it is bonded, serving as the sacrificial items. However, diamond point machining is expensive. In addition, the kinematic fasteners used to secure the mirror to the mount plate can be complex.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial overview of technology embodiments is provided below and then specific technology embodiments are described in further detail later. This initial summary is intended to aid readers in understanding the technology more quickly, but is not intended to identify key features or essential features of the technology, nor is it intended to limit the scope of the claimed subject matter.

An optical device mount is disclosed that substantially minimizes or eliminates mounting-induced forces, and facilitates multiple degrees of alignment positioning, i.e., translation and rotation, for ultra-precision registration of an optical device within an optical system. In one aspect, the optical mount includes a sleeve having a bore defining an inner bonding surface and having an outer portion attached to an optical device. A stud at least partially extends through the bore of the sleeve and has an outer bonding surface. The stud includes an optical housing interface that mates to an optical housing. The optical device mount can further comprise a curable material deposited within a volume of space defined by the outer bonding surface of the stud and the inner bonding surface of the sleeve.

A mounting system is disclosed that facilitates precise alignment of an optical device and provides for inexpensive replacement of the mounting hardware. The system includes an optical device, a housing, and a plurality of optical device mounts coupling the optical device to the housing. The plurality of optical device mounts can comprise three mounts, each having features as described herein.

A method of aligning and mounting an optical device is further disclosed. The method includes coupling an optical device to an optical housing with a plurality of optical device mounts (e.g., three optical device mounts). For each optical device mount, the method can further include attaching a stud to the optical housing. The stud includes an outer bonding surface extending from the optical housing. The method can further include attaching a sleeve to the optical device. The sleeve includes a bore defining an inner bonding surface. For each mount, the outer bonding surface of the stud can be positioned through the bore of the sleeve. The optical device can then be aligned to a desired position once all three studs are positioned through corresponding sleeves. A curable material can then be deposited into a volume of space defined by the outer bonding surface of each stud and the inner bonding surface of the corresponding sleeve.

Generally speaking, the invention provides a more structurally robust configuration while eliminating the requirement for expensive diamond point machining on both the mount plate and back of the mirror. Kinematic fasteners, previously used to secure the mirror to the mount plate, are replaced with simpler hardware.

This improved mount utilizes multiple (e.g., typically three), independent sets of attachment hardware, but eliminates the requirement to perfectly constrain the mirror coplanar to an intermediate mount plate. Rather, these sets of attachment hardware only induce compressive forces, not bending, onto the attachment ears of the mirror, and are then bonded, in a free state, onto studs secured to the optical housing. Thus eliminating the sacrificial mount plate eliminated the constraint responsible for inducing bending forces into the mirror. A sleeve component, within each individual attachment hardware set, serves as the sacrificial element, and is significantly less expensive to fabricate than the diamond point machined mount plate.

Figure 1:
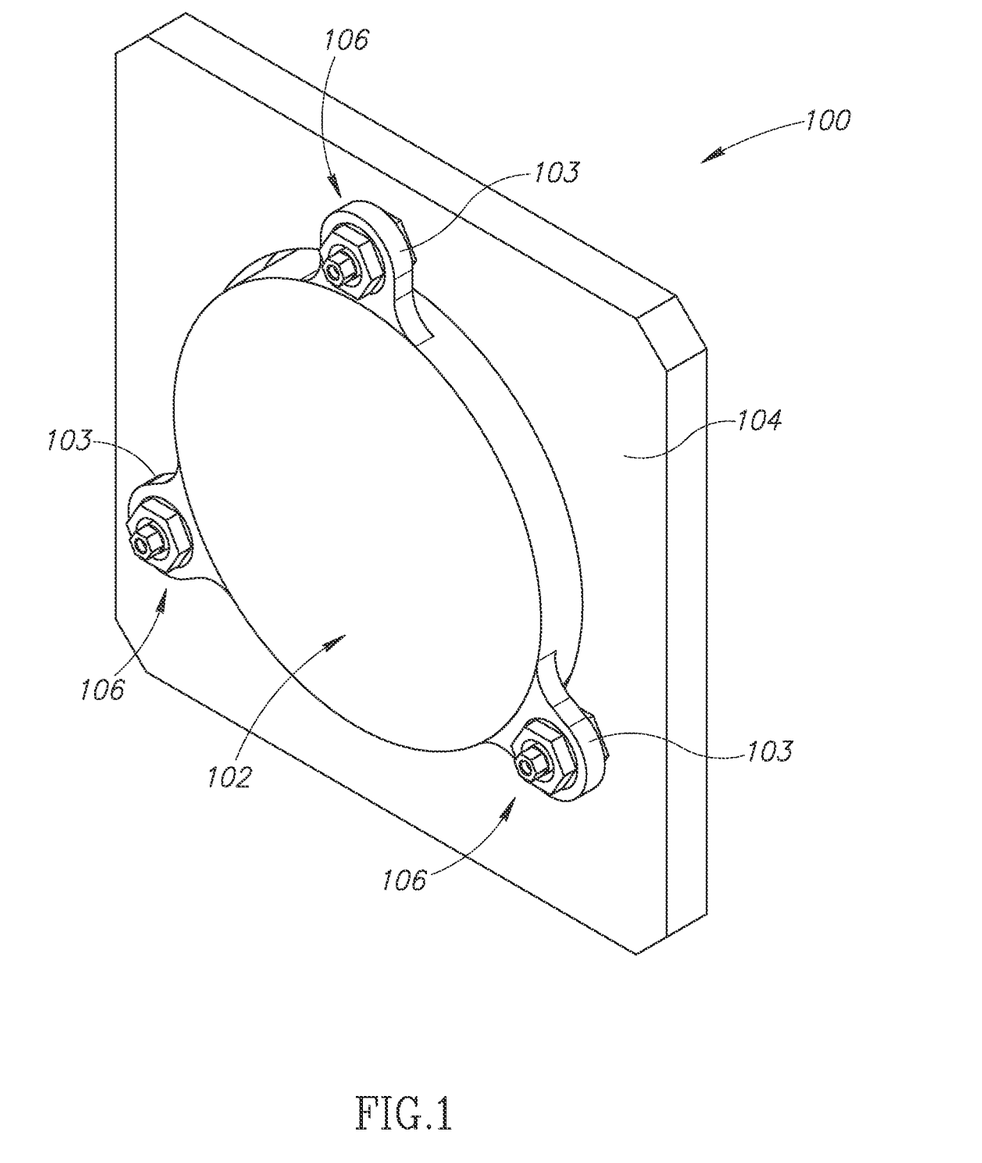
FIG. 1 is an isometric view of an optical mounting system having three mounts in accordance with an embodiment of the present invention.

FIG. 1 shows an optical mounting system 100 in accordance with one example. The system 100 comprises an optical device 102, a housing 104, and a plurality of mounts 106 that couple the optical device 102 to the housing 104. The optical device 102 may be one of a metal mirror, lens, laser, light source, or other radiation emitting, transmitting, receiving, or reflecting device mountable to a structure. In this example, the optical device 102 is a metal mirror, such as a polished aluminum mirror used in a telescope of an unmanned aircraft. The optical device 102 includes three integral ears 103. The housing 104 may be any structure or component to which an optical device 102 is removably attached. For purposes of illustration, a generic housing is shown. In this example, the plurality of mounts include three mounts 106. However, it will be appreciated that any number of such mounts may be used with the system as needed or desired.

Figure 2:
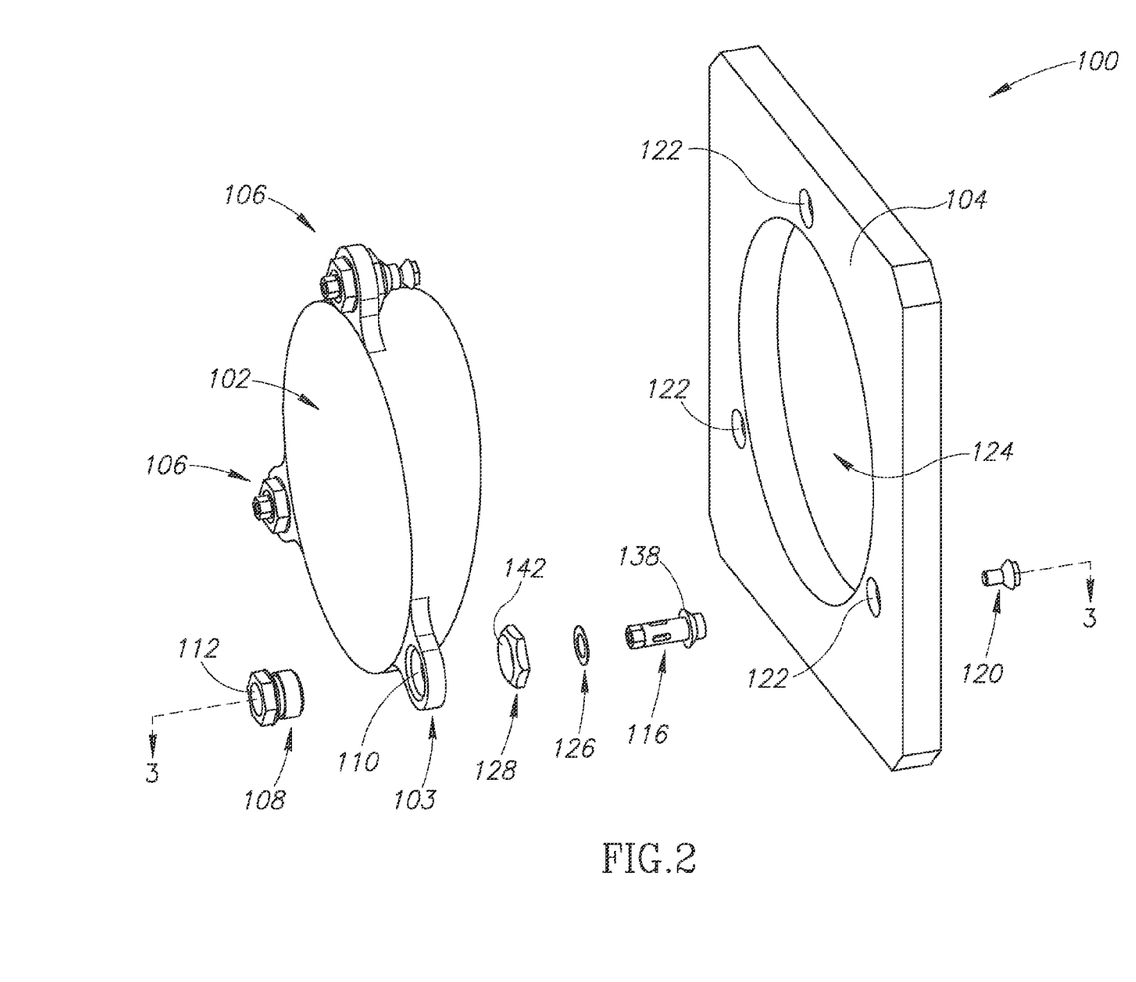
FIG. 2 is an isometric view of the optical mounting system of FIG. 1, showing in an exploded manner some of the components of the optical mounting system, and particularly one of the mounts thereof.
Figure 3:
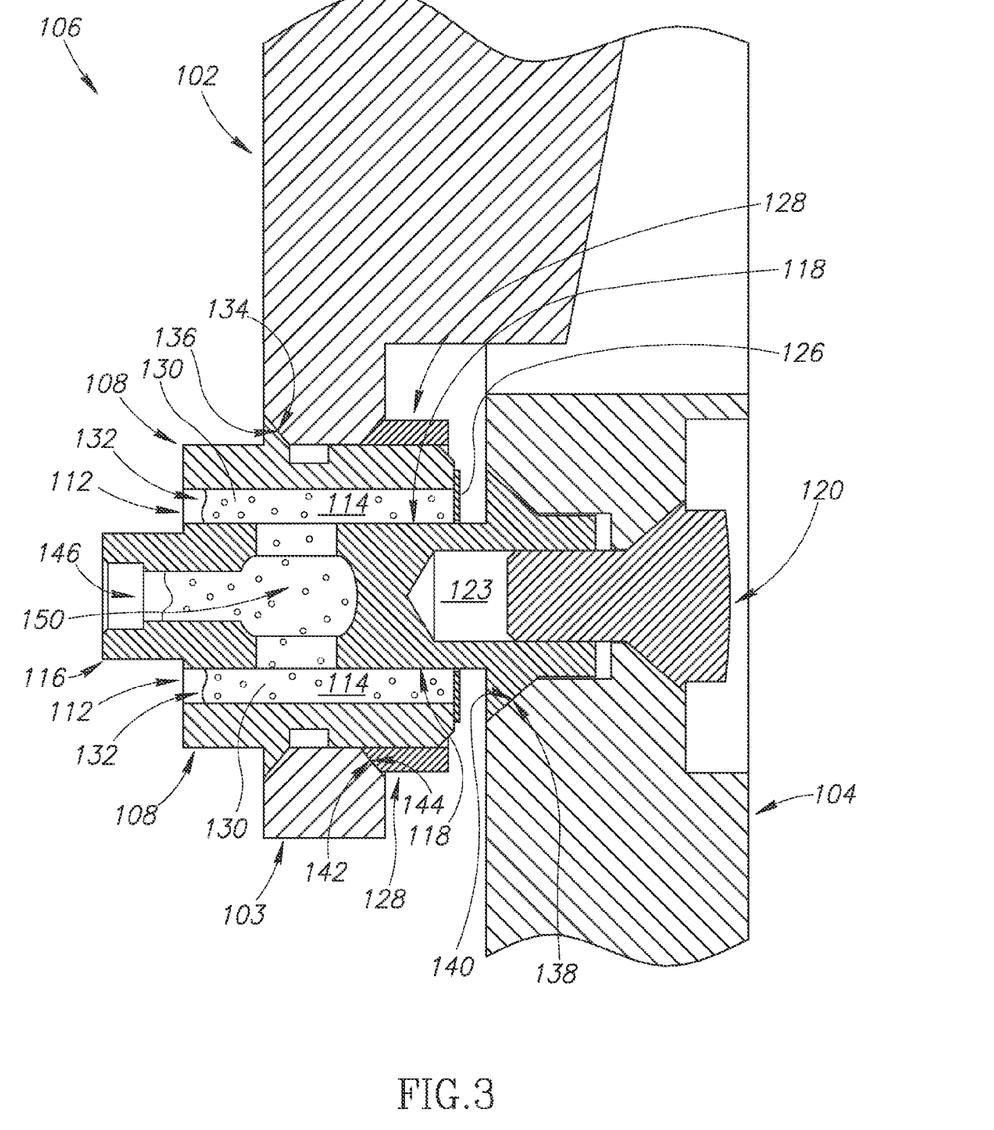
FIG. 3 is a cross sectional view of the mount of FIG. 2, taken along Line 3-3.

FIG. 2 illustrates the optical mounting system 100 of FIG. 1 with the lower mount 106 shown in an exploded manner. FIG. 3 is a cross-sectional view of this mount 106. With reference to FIGS. 2 and 3, when mounted, the optical device 102 at least partially extends through a receiving opening 124 of the housing 104 (see FIG. 2).

Each mount 106 includes a sleeve 108 extending through a mounting hole 110 of the corresponding ear 103 of the optical device 102 (FIG. 2). The sleeve 108 includes a bore 112 defining an inner bonding surface 114 (FIG. 3). The mount 106 includes a stud 116 attached to the optical housing 102 and having an outer bonding surface 118 at least partially extending through the bore 112 of the sleeve 108. A fastener 120 extends through a hole 122 of the optical housing 104 (FIG. 2) and is fastened (e.g., threaded) to the stud 116 (e.g., via a central borehole 123 of the stud 116 (FIG. 3)).

The mount 106 further includes a washer 126 positioned adjacent the sleeve 108 and spatially between the sleeve 108 and the optical housing 104. The washer 126 is loosely biased against the sleeve 108 and positioned around the stud 116. The washer 126 can be comprised of a flexible material such as a mylar, silicon, rubber, or polymer, so as to prevent an adhesive connection between the face of the conical flange of the stud 116, or the housing 104, and the sleeve 108, or the optical device 102, or the retaining collar 128. A retaining collar 128 is positioned around the sleeve 108 to assist with mounting the sleeve 108 to the optical device 102. The retaining collar 128 may be a threaded or other type of collar that is screwed onto the sleeve 108 to restrain the sleeve 108 to the optical device 102.

With continued reference to FIG. 3, a curable material 130 is deposited within a volume of space 132 defined by the outer bonding surface 118 of the stud 116 and the inner bonding surface 114 of the sleeve. During depositing of the curable material 130 into the volume of space 132 (e.g., in one aspect, the step of depositing can comprise depositing an epoxy with a syringe), the washer 126 facilitates retaining the curable material 130 in the volume of space 132 and prevents the curable material 130 from coming in contact with the optical housing 104. This is beneficial as it prevents the possible generation of an undesirable axial bonding load between the optical device 102 and the optical housing 104, as with known mounting systems. Accordingly, the sleeve 108 and the stud 116 are not in direct contact with each other, the curable material 130 being the only component/device that directly attaches the optical device 102 to the optical housing 104. With this configuration, the optical device 102 tends to "float" relative to its optical housing and can thus be positioned angularly and in translation, using precision alignment equipment, and secured in a minimum-stress state via the bond formed by the curable material 130. This substantially minimizes or eliminates preloaded forces (e.g., axial bolt-up and bending forces) exerted on the optical device 102 from the mounting system components as compared to known systems.

Maintaining optical alignment during exposure to inertial forces means that the sleeve 108 and the mating retaining collar 128 restrain the optical device 102 against such induced loads and moments. Conical features, at the mating interfaces of these three components, can provide two orthogonal axes of constraint, perpendicular to the axis of theses cones. Mating opposing pairs of components with conical interfaces, as with the sleeve 108 and the retaining collar 128 mating against countersinks in the ears 103 of the optical device 102, provide a third axis of restraint along the common axis of the cones. When such groups of conically shaped components are used in combination, such as in a pattern of three sets, they add constraints against rotations about the axes of the conical features, thereby fully restraining the optical device 102. Thus, the utilization of multiple conical features at mating interfaces can ensure complete geometric constraint, whereas prior bolted planar joints can only rely on unpredictable friction to provide restraint against shearing loads at these interfaces. Therefore, through utilizing sets of conical interfacing components, that are positionally-decoupled from one another because of the "floating" curable material 130, the optical device 102 may be rigidly restrained without being over-constrained, i.e., without inducing bending across its optical surface.

In designing conical features, considerations exist regarding optimizing the angle of the cone. When conical surfaces mate and are preloaded together along the axis of the cones, (as with the sleeve 108 mating with the retaining collar 128, to sandwich against the countersunk holes in the ears 103 of the optical device 102), forces are generated both along and perpendicular to the mating surfaces of the cones. With smaller cone angles, the lines of action of the perpendicular forces are primarily radial, with respect to the cone axis. Thus forces applied using components with smaller cone angles induce greater radial strain on the mating surfaces. Since the ultimate goal of this design is to provide maximized structural rigidity to the optical device 102, with minimal strain on the optical surface of that device, it is obvious that larger cone angles minimize the "radial footprint" of the induced strain onto both the ears 103, and the optical surface, of the optical device 102. Extrapolating this "footprint" concept to cone angles approaching 180 degrees, however, proves unrealistic as the radial component of the perpendicular forces friction forces now approaches zero. Thus, for very large cone angles, it is the friction in the conical joints, not the geometry, that actually dominates the joint's load capabilities, (as with planar bolted joints). For this particular application, various cone angles ranging from 82 to 120 are viable, but cone angles of 100 degrees provides an optimum combination of load capabilities for each component, while minimizing the induced strain onto the optical surface of the optical device 102 to very acceptable limits.

Figure 4:
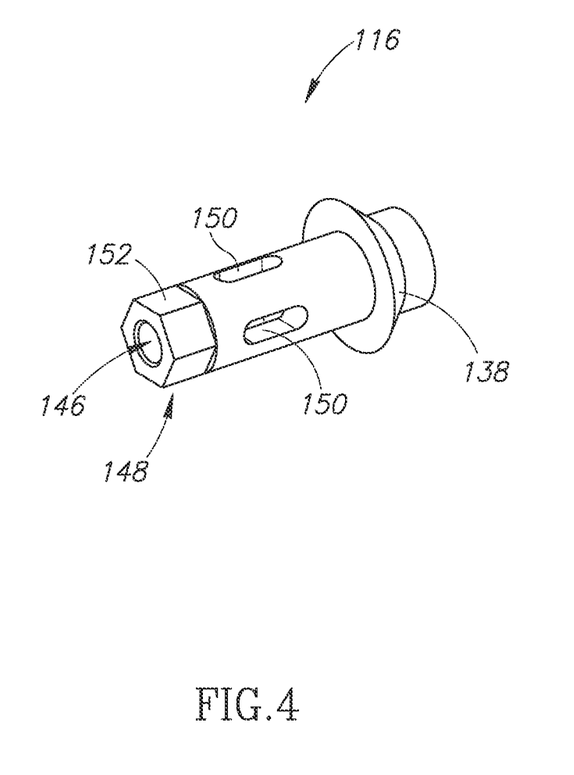
FIG. 4 is an isometric view of a stud of the mount of FIGS. 2 and 3.

With more detailed reference to FIG. 3, the stud 116 includes an optical housing interface, such as an annular conical portion 138 (e.g., a flange), mateable with a corresponding conical surface 140 of the optical housing 104 (see also FIG. 4 for conical portion 138). The sleeve 108 also includes an annular conical portion 134 (e.g., a flange) mateable with a corresponding conical surface 136 of the ear 103 of the optical device 102 (e.g., in a threaded manner). Likewise, the retaining collar 128 includes an annular conical portion 142 (FIG. 2) mateable with a corresponding conical surface 144 of the optical device 102. Thus, the mounting hole 110 of ear 103 is counter sunk on both sides of the hole such that the conical portion 142 of the retaining collar 128 and the conical portion 134 of the sleeve 108 tend to pinch the mounting hole 110 of the optical device 102. To this end, the retaining collar 128 is a hex nut that is threaded onto the sleeve 108 and torqued to secure the sleeve 108 to the optical device 102.

With respect to an exemplary optical device similar to the one shown in FIG. 3, a finite element structural analysis was performed to predict the self-induced distortions onto the exemplary optical device (metal mirror), when subjected to pinching of its mounting hole. The analysis simulated a 300 pound axial load resulting from torqueing of the retaining collar on the sleeve. The flanges on both these components generated pressure loads against the countersink surfaces of the mounting hole. This loading condition was applied to all three mounting tabs of the optical device, simultaneously. The 300 pound clamping load on all three tabs of the device, which in this example weighed 0.39 pounds, represented a preload capability of over 2300 G's (i.e., 2300 times the weight of the device). The worst case results of the analysis predicted that the optical surface of the device deformed 7.0 microinches peak-to-peak, or 1.3 microinches RMS, over the entire optical face of the 3.0 inch diameter optic. The design requirement was 1.74 microinches per 0.34 inches of surface period over the optical face, i.e., about 15 microinches peak-to-peak. Thus, the analysis predicted a very structurally robust design that could highly decouple very significant preload forces from the optical surface of the device.

The mounting and aligning method steps will be discussed in detail below.

With continued reference to FIG. 3, of particular advantage, the aforementioned annular conical interface portions and surfaces tend to resist both translational shear forces and bending moments exerted on respective components of the sleeve 108, the stud 116, and the optical housing 104 to provide a structurally robust joint during use of the optical device 102. Such features, along with the configuration of the curable material 114 coupling the optical housing 104 to the optical device 102, cooperate to substantially minimize or eliminate "self-deforming" forces exerted on the optical device 102 as compared to known systems.

In one aspect, the sleeve 108, stud, 116, and optical device 102 can be comprised of the same type of metal, such as 6061 aluminum having a certain coefficient of thermal expansion (CTE). The curable material 130 may also have a CTE at, or substantially similar, to the CTE of the sleeve 108, stud 116, and optical device 102. Accordingly, during thermal changes the optical device 102 experiences no or very little external forces (particularly axial forces which can induce bending moments across the device) because the optical device 102 will expand and contract at the same rate as the CTE-matched material of the sleeve 108 and the stud 116, and even the curable material 130 depending upon its CTE. Of note, and in one aspect, the sleeve 108, stud 116, curable material 130, and ear 103 of the optical device 102 can comprise an annular or cylindrical shape, such that, during thermal changes, the components expand and contract radially and at the same, or substantially the same, rate.

With reference to the particular stud 116 shown in FIGS. 3 and 4, the stud 116 includes an opening 146 through a distal end 148. A plurality of passageways 150 are formed in the outer bonding surface 118 of the stud 116, which are in fluid communication with the opening 146. In the presently discussed embodiment, the curable material 130 is deposited (e.g., with a syringe) into the opening 146 and caused to flow through the passageways 150 into the volume of space 132 (FIG. 3). The configuration of the passageways 150 assist to ensure uniform distribution of the curable material 130 into the volume of space 132 to adhere the stud 116 to the sleeve 108. Such a configuration further ensures uniform load capabilities of the bonded joint between the stud 116 and the sleeve 108. The passageways 150 are shown as slots formed through a central portion of the stud 116 and in fluid communication with the opening 146, but the passageways 150 may be any type of similar opening or openings through the stud 116. The stud 116 may include a hex head 152 used to secure the stud 116 when mounting it to the housing 104 using the fastener 120 (FIG. 3).

Figure 5:
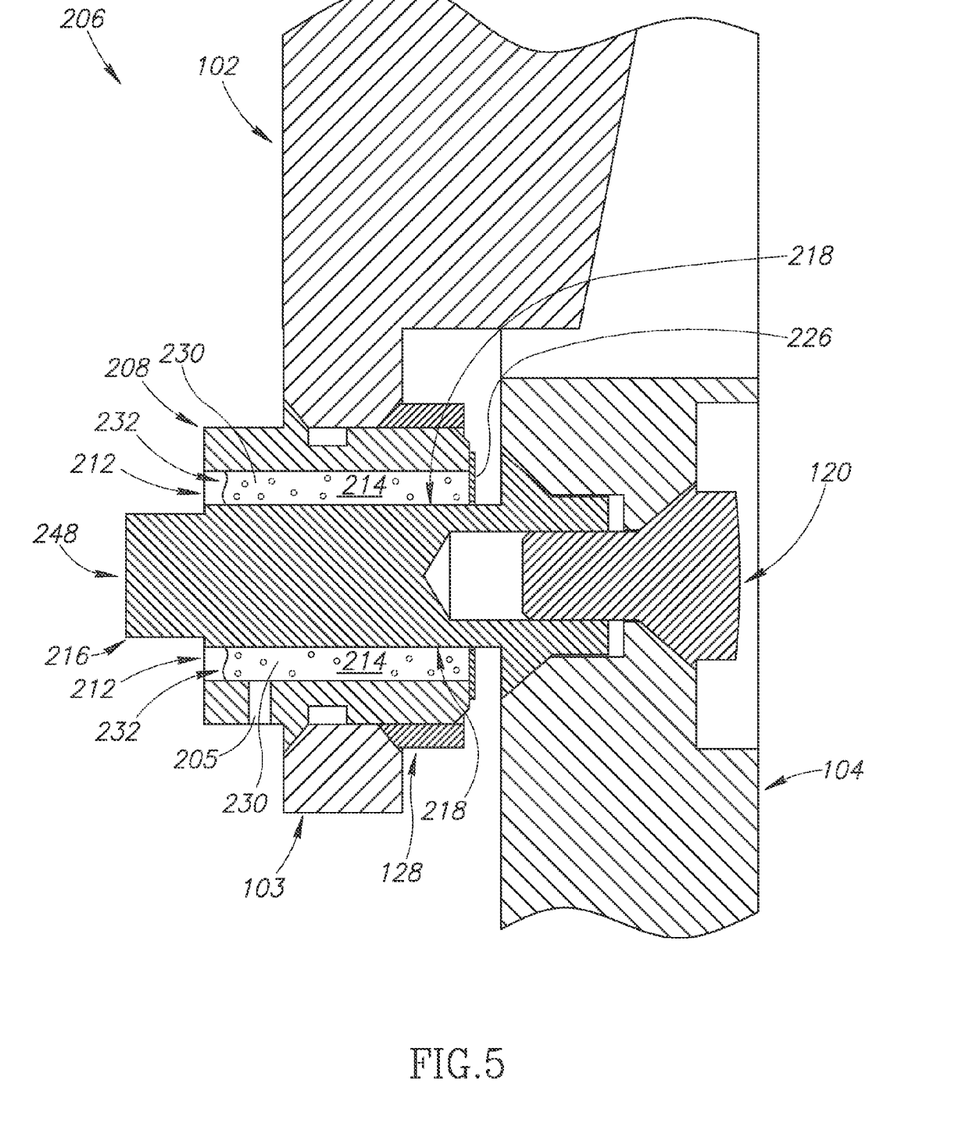
FIG. 5 is a cross sectional view of a mount for an optical mounting system in accordance with another embodiment of the present invention.

FIG. 5 shows another example of a mount 206 that can be a mount of the system 100 discussed above. In this example, a distal end 248 of a stud 216 is a solid bolt end (as opposed to the open stud 116 described above). This stud design accommodates the addition of external features, such as a helical thread, in place of a purely cylindrical profile. If desirable, external features can provide a tailoring of load capability, such as additional shear load capacity that was facilitated by the addition of a helical thread profile. A sleeve 208, positioned through the ear 103 of the optical device 102, can include an opening 205 to receive a dispensed curable material 230. Similar to the sleeve of FIGS. 2 and 3, the curable material 230 occupies a volume of space 232 defined by an outer bonding surface 218 of the stud 216 and the inner bonding surface 214 of the sleeve 208. The curable material 230 may be dispensed through opening 205 of the sleeve 208, or it may be deposited through the opening defined by bore 212 of the sleeve 208. Accordingly, the optical device 102 and the optical housing 104 are attached or coupled only by the curable material 230. The mount 206 may have many of the same or similar features as discussed with reference to FIG. 3, such as the fastener 120, the retaining collar 128, the washer 126, and identical conical portions and corresponding conical surfaces discussed above.

Figure 6:
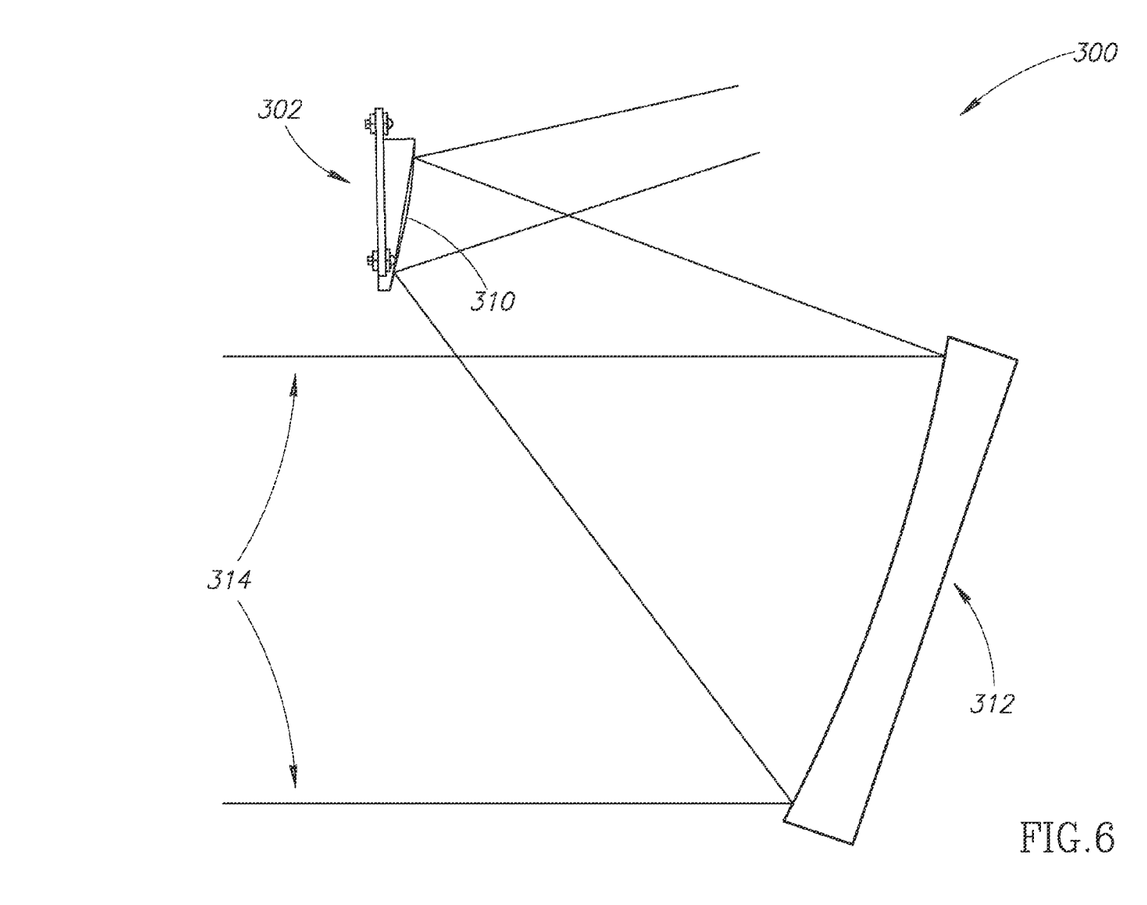
FIG. 6 is a schematic illustration of a method for aligning an optical device of an optical mounting system in accordance with an embodiment of the present invention.

FIG. 6 shows a schematic illustration of a method 300 for aligning an optical device in accordance with an example of the present invention. Generally, the method includes aligning and mounting an optical device 302, such as by using the mounting components and methods disclosed with reference to the examples of FIGS. 2-4 and the example of FIG. 5. For purposes of illustration, the following method steps are discussed with reference to the example of FIGS. 2-4.

With particular reference to FIGS. 2 and 3, and with continued reference to FIG. 6, the method includes attaching three studs 116 to the optical housing 104 with fasteners 120 through holes 122 of the optical housing 104. Three sleeves 108 are inserted through corresponding holes 110 of the ears 103 of the optical device 102/302. The retaining collars 128 are then positioned around each sleeve 108 and tightened. Thus, the sleeves 108 are now secured to the optical device 102/302. Three washers 126 may then be positioned over the corresponding studs 116. The sleeves 108 are then positioned about three corresponding studs 116, such that the outer bonding surface 118 of each stud 116 is positioned through the bore 112 of each sleeve 108 to define the volume of space 132 (FIG. 3).

The optical device 102/302 is then aligned to a desired position. In one example, the optical device 102/302 can be aligned by viewing the primary optical device 312, using two or more rays 314 as shown, with an interferometer (not shown). Depending on the particular geometry of the optical system, a retro-optic (i.e., flat or corner cube mirror) can be positioned downstream of the optical device 102/302 being aligned. The retro-optic returns the collimated light, output from the interferometer, back to this instrument once it has double-passed through the optical system. Interrogation of the returned optical wavefront, in comparison to the almost perfect plane wavefront emitted by the interferometer, provides insight into the most appropriate positioning of the optical device 102/302 for minimum wavefront error, i.e., optimum imagery. Before the curable material 130 is deposited into each of the studs 116 of the three mounting systems 106, the optical device 102/302 is movable in six degrees of freedom (i.e., along the x-y-z axes, and in the pitch, yaw and roll degrees of freedom) in order to precisely align the optical device 102/302 to the desired position relative to the primary optical device 312, for example. Thus, the optical device 102/302 tends to "float" relative to the optical housing 104 while an operator (and/or a machine) precisely aligns the optical device 102/302 to the desired position. Once properly aligned, the optical device 102/302 can be held securely in space by fixturing while the curable material 130 is deposited into each volume of space 132 and allowed to cure.

As discussed above, depositing the curable material 130 includes depositing (e.g., inserting) it through the opening 146 of each stud 116. The curable material 130 then uniformly flows through the passageways 150 of each stud 116 to the inner bonding surface 114 of each sleeve 108 to occupy the volume of space 132 of each mounting system 106. Curing of the curable material 130 functions to attach or couple the optical device 102/302 and optical housing 104 to each other. The same or similar steps and principles hold true with reference to the example of FIG. 5, where the stud 216 is a solid member on the end and the curable material is deposited through the volume of space 232 between the sleeve 208 and the outer bonding surface 218, of the stud 216.

Because the studs and the sleeves are comprised of relatively inexpensive material, such as machined aluminum, for example, the optical device 102/302 can be easily removed and replaced or realigned in the event of damage and/or misalignment. In such cases, and with reference again to FIG. 3, the studs 116 are removed from the housing 104, by first removing each of the fasteners 120 from each stud 116. The studs 116 remain bonded to the sleeves 108 so that the entire optical device 102 can be separated from the housing 104. The retaining collars 128 are removed from the sleeves 108, and the sleeves 108, with bonded studs 116 and washers 126, are then removed from the optical device 102. The mounting hardware (i.e., the studs, washers, and sleeves) can now be discarded and inexpensively replaced. An optical device (whether new or repaired) can now be aligned and mounted in the manner as described above. These processes for disposal of the mounting hardware and realignment of an optical device are highly advantageous over known methods because it is much quicker and inexpensive to replace the disclosed mounting hardware.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. An optical device mount, comprising:
a sleeve having a bore defining an inner bonding surface and having an outer portion attached to an optical device;
a stud at least partially extending through the bore of the sleeve and having an outer bonding surface whereby a volume of space is defined between the sleeve and the outer bonding surface, the stud having an opening and a plurality of passageways in fluid communication with the opening and with the volume of space, the stud having an optical housing interface that mates to an optical housing; and
a curable material deposited via the opening and disposed throughout the passageways and the volume of space.

2. The optical device mount of claim 1, wherein the curable material is an epoxy and wherein the sleeve and the stud are not in direct contact with each other such that the optical device and optical housing are only coupled by the curable material, thereby minimizing or eliminating shear or bending forces exertable on the optical device.

3. The optical device mount of claim 1, wherein the sleeve and the stud are comprised of the same type of metal such that thermal expansion properties of the sleeve and the stud are the same or substantially similar.

4. The optical device mount of claim 1, wherein the outer portion of the sleeve includes a conical portion that mates against a corresponding conical surface of the optical device.

5. The optical device mount of claim 4, wherein the conical portion comprises a conical angle between about 82 and 120 degrees.

6. The optical device mount of claim 4, wherein the conical portion comprises a conical angle of 100 degrees.

7. The optical device mount of claim 1, wherein the stud includes a conical portion that mates against a corresponding conical surface of the optical housing.

8. The optical device mount of claim 1, wherein the opening is formed through a distal end of the stud and the plurality of passageways include four passageways formed through the outer bonding surface.

9. The optical device mount of claim 1, further comprising a fastener attached to the proximal end of the stud and fastening the stud to the optical housing, wherein the optical housing interface of the stud includes a conical portion and the fastener includes a conical portion, wherein the conical portions mate to respective conical surfaces of the optical housing.

10. The optical device mount of claim 1, further comprising a retaining collar and a washer, the retaining collar positioned around the sleeve to attach the sleeve to the optical device, and the washer positioned adjacent the sleeve and between the sleeve and the optical housing to prevent the curable material from contacting the optical housing.

11. A mount system for alignment and mounting of an optical device, the mount system comprising:
an optical device;
a housing;

a plurality of mounts coupling the optical device to the housing, each mount including:
  a sleeve extending through a mounting hole of the optical device and attached to the optical device, the sleeve having a bore defining an inner bonding surface;
  a stud attached to the optical housing and having an outer bonding surface at least partially extending through the bore of the sleeve, whereby a volume of space is defined between the outer bonding surface of the stud and the inner bonding surface of the sleeve, the stud having an opening and a plurality of passageways in fluid communication with the opening and with the volume of space; and
  a curable material deposited via the opening and disposed throughout the passageways and the volume of space.

12. The system of claim 11, wherein the curable material is an epoxy and wherein the sleeve and the stud of each mount are not in direct contact with each other such that the optical device and optical housing are only coupled by the curable material, thereby minimizing or eliminating shear or bending forces exertable on the optical device.

13. The system of claim 11, wherein the sleeve and the stud are comprised of the same type of metal as the optical device such that thermal expansion properties of the sleeve, stud, and optical device are the same or substantially similar.

14. The system of claim 11, wherein the sleeve of each mount includes a conical portion that mate against a corresponding conical surface of the optical device, and wherein the stud includes a conical portion that mates against a corresponding conical surface of the optical housing.

15. The system of claim 11, wherein the plurality of passageways of each stud include four passageways formed around the outer bonding surface.

16. The system of claim 11, wherein, before the curable material is cured in the volume of space, the optical device is movable in six degrees of freedom relative to the optical housing about the plurality of mounts, such that the optical device may be precisely aligned relative to another optical device before bonded to the optical housing by the curable material.

17. A method of aligning and mounting an optical device, the method comprising:
  attaching a stud to an optical housing, the stud having an outer bonding surface extending from the optical housing, the stud having an opening and a plurality of passageways in fluid communication with the opening;
  attaching a sleeve to the optical device, the sleeve having a bore defining an inner bonding surface, whereby a volume of space is defined between the outer bonding surface and the inner bonding surface, wherein the passageways are in fluid communication with the volume of space;
  positioning the outer bonding surface of the stud through the bore of the sleeve;
  aligning the optical device to a desired position; and
  depositing a curable material into the passageways and the volume of space via the opening.

18. The method of claim 17, wherein aligning the optical device to the desired position includes moving the optical device according to the position of a primary optical device or an alignment tool, whereby the optical device is movable in six degrees of freedom before the curable material is cured.

19. The method of claim 17, further comprising allowing the curable material to cure, wherein the curable material is an epoxy, thereby fastening the optical housing to the optical device only by the curable material, such that shear or bending forces between the optical housing and the optical device are minimized or eliminated.

20. The method of claim 17, further comprising performing the steps of claim 17 in two more instances such that at least three sets of studs and sleeves couple the optical device to the optical housing via only the curable material, whereby the studs, the sleeves, and the optical device are comprised of the same type of material having the same or substantially similar thermal expansion properties.

21. The method of claim 17, wherein the attaching the sleeve includes fastening the sleeve to the optical devices with a retaining collar, the retaining collar having a conical portion that mates against a corresponding conical surface of the optical device, and wherein the sleeve includes a conical portion that mates against an opposing corresponding conical surface of the optical device.

22. The method of claim 17, further comprising:
  allowing the curable material to cure;
  removing the sleeve from the stud by breaking the bond of the curable material;
  removing the stud from the optical housing and removing the sleeve from the optical device, and
  repeating the steps of claim 17 for replacement of the stud and the sleeve.

* * * * *